June 21, 1966 J. E. SMITH 3,256,827
HYDRAULIC POWER CONVERTER
Filed Dec. 21, 1964 11 Sheets-Sheet 1
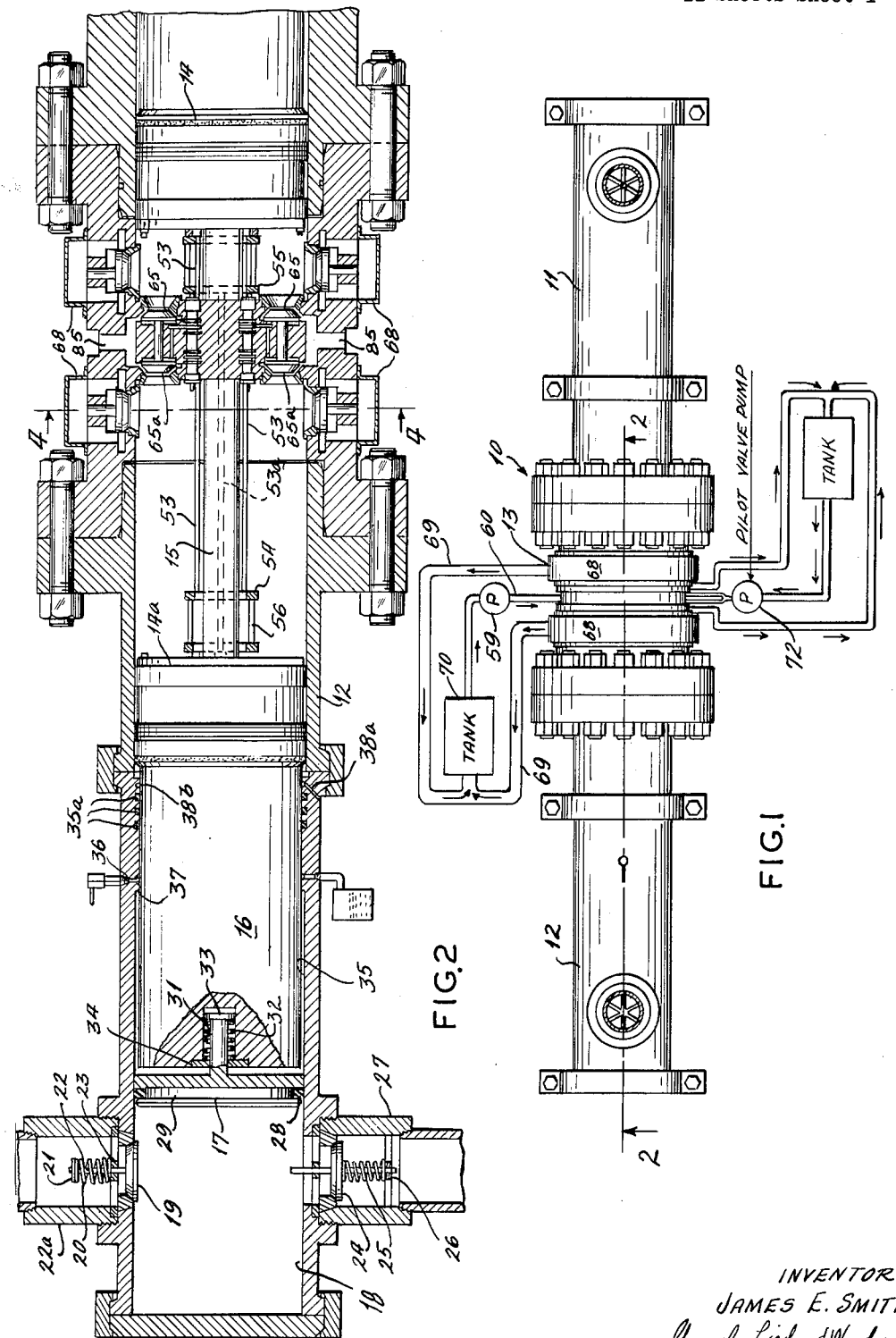
INVENTOR:
JAMES E. SMITH
BY Gravely Lieder & Woodruff
ATTORNEYS.

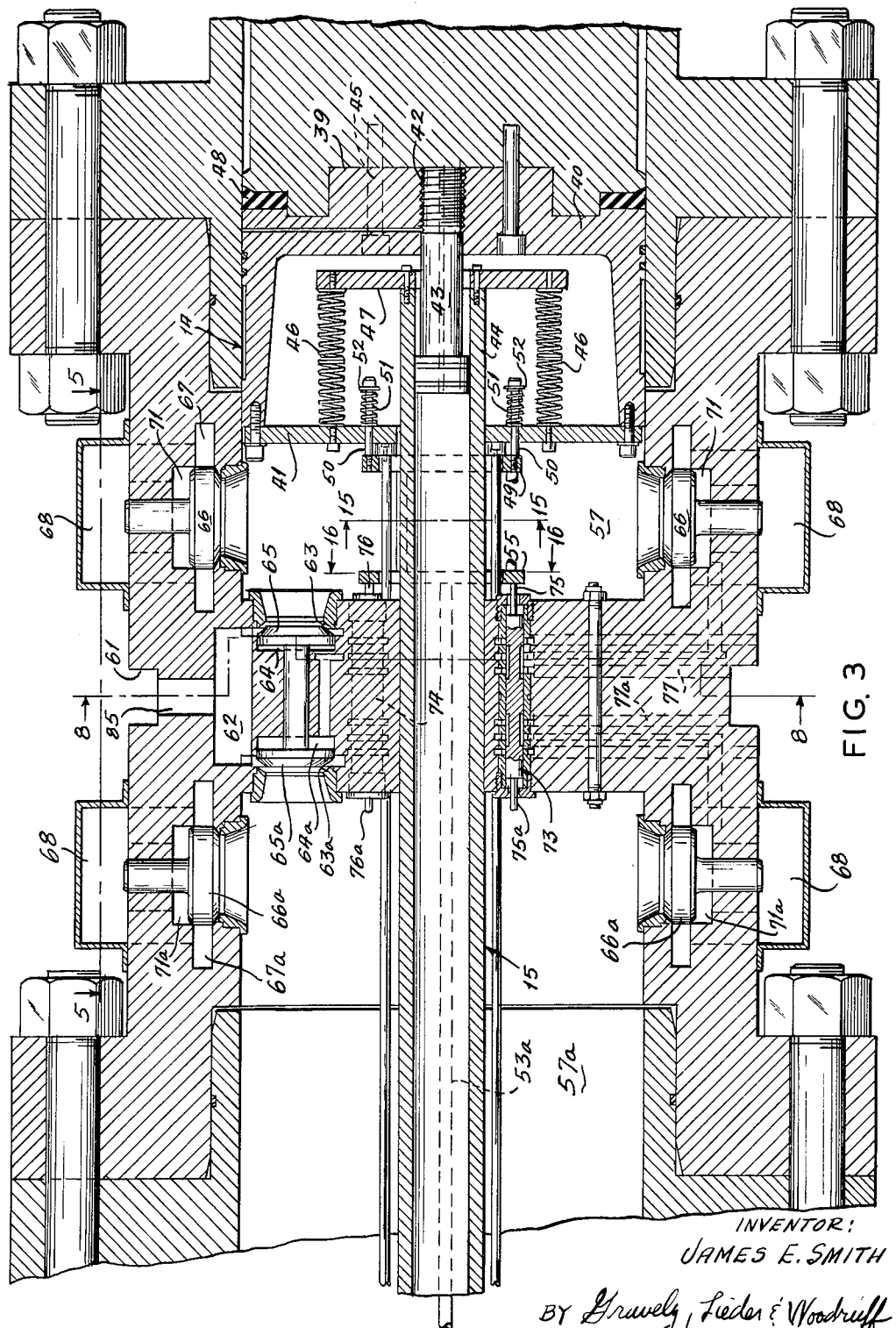

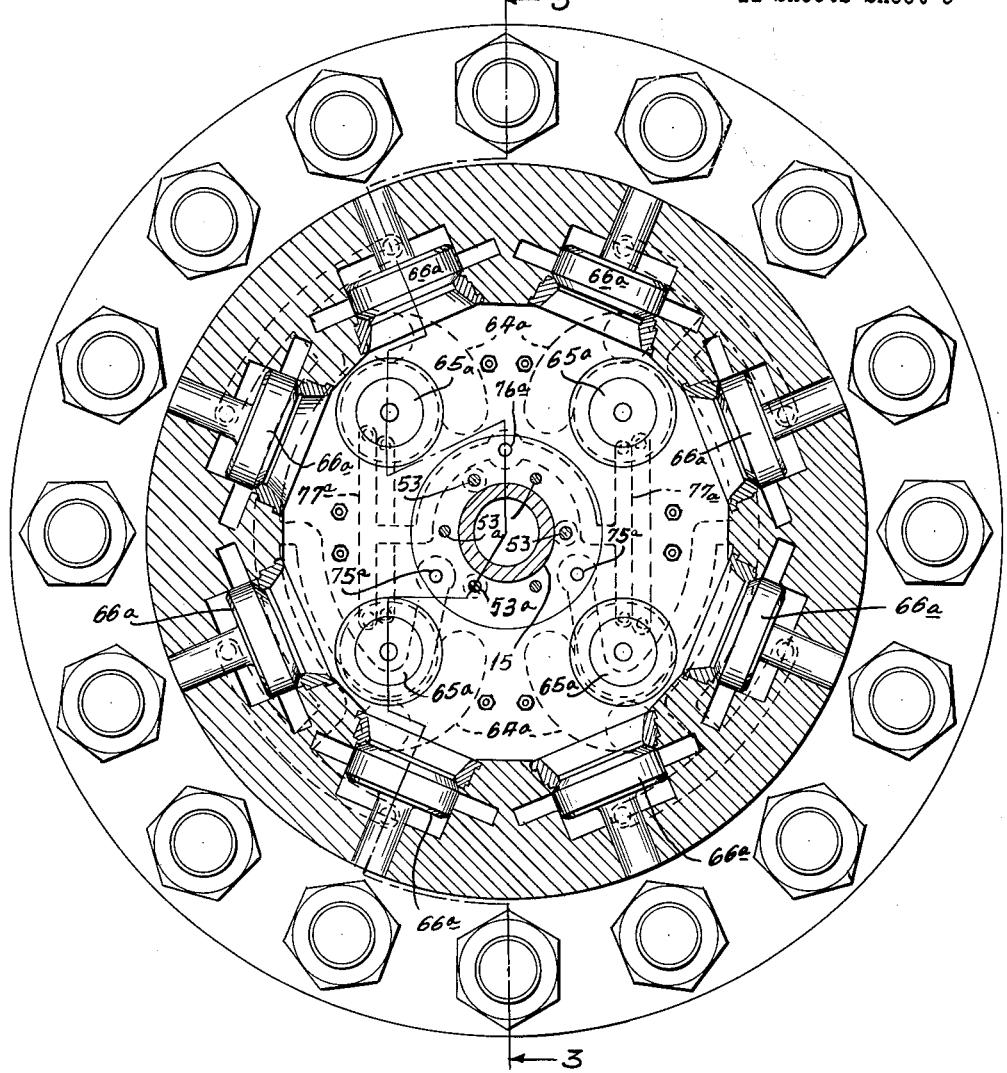

June 21, 1966

J. E. SMITH 3,256,827

HYDRAULIC POWER CONVERTER

Filed Dec. 21, 1964

INVENTOR:
JAMES E. SMITH
BY Gravely, Lieder & Woodruff
ATTORNEYS.

June 21, 1966  J. E. SMITH  3,256,827
HYDRAULIC POWER CONVERTER
Filed Dec. 21, 1964  11 Sheets-Sheet 7
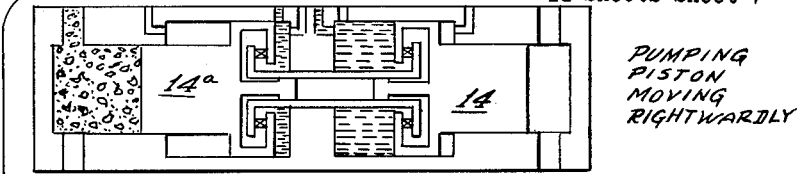
FIG. 9
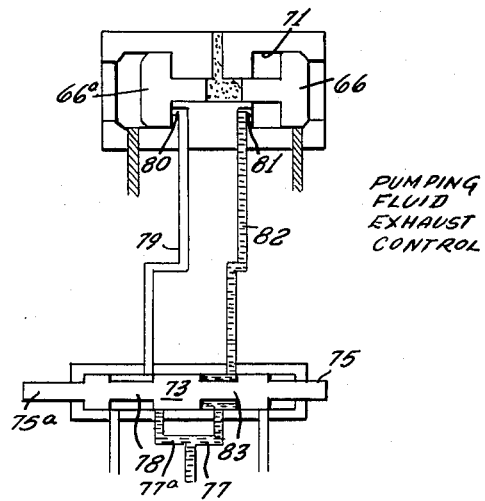
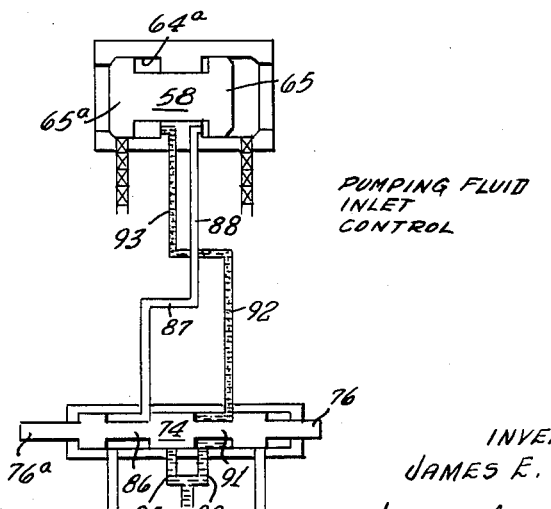
INVENTOR:
JAMES E. SMITH
BY Gravely Lieder & Woodruff
ATTORNEYS.

June 21, 1966  J. E. SMITH  3,256,827
HYDRAULIC POWER CONVERTER
Filed Dec. 21, 1964  11 Sheets-Sheet 8
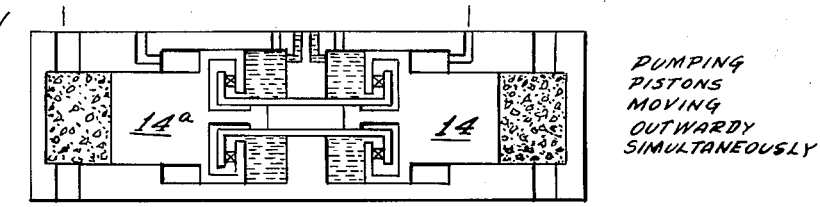
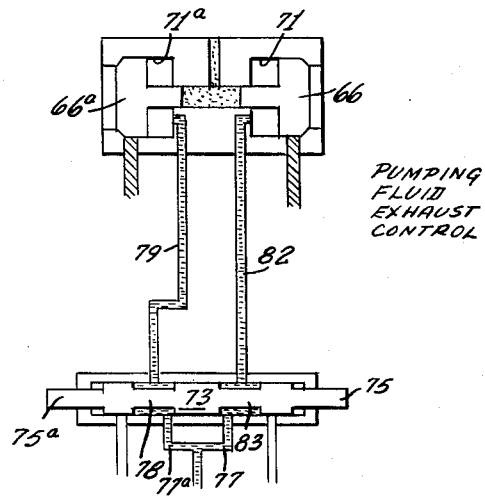
FIG. 10
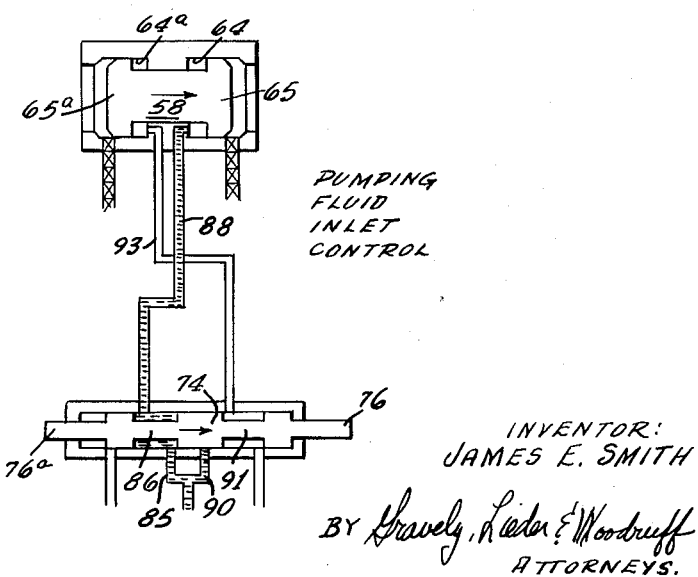
INVENTOR:
JAMES E. SMITH
BY Gravely, Lieder & Woodruff
ATTORNEYS.

June 21, 1966  J. E. SMITH  3,256,827
HYDRAULIC POWER CONVERTER
Filed Dec. 21, 1964  11 Sheets-Sheet 10

INVENTOR:
JAMES E. SMITH
BY Gravely Lieder & Woodruff
ATTORNEYS.

June 21, 1966     J. E. SMITH     3,256,827

HYDRAULIC POWER CONVERTER

Filed Dec. 21, 1964     11 Sheets-Sheet 11

INVENTOR:
JAMES E. SMITH
BY Gravely, Lieder & Woodruff
ATTORNEYS.

United States Patent Office 3,256,827
Patented June 21, 1966

3,256,827
HYDRAULIC POWER CONVERTER
James E. Smith, 302 Plantation Drive,
Lake Jackson, Tex.
Filed Dec. 21, 1964, Ser. No. 420,028
14 Claims. (Cl. 103—51)

This invention relates to a hydraulic power converter for exerting the pressure of pumped fluids from a prime mover pump and maintained in separation from the fluids or slurries to be moved or pumped by the converter, and is a continuation-in-part of my co-pending application Serial No. 175,767 filed February 26, 1962, now U.S. Patent No. 3,162,133 granted December 22, 1964.

In particular, the present invention relates to a hydraulic converter for the movement or transmission of fluids or slurries which might be incompatible or damaging to a centrifugal or other hydraulic pump were these fluids or slurries allowed to pass directly therethrough. The hydraulic converter is powered by clean hydraulic fluid in continuous circulation from a centrifugal or other non-pulsating source and uses this force to move a different fluid or slurry under pressure in such a manner as to prevent the hydraulic fluid from co-mingling with the pumped fluid or slurry.

In working with fluids under high pressure, one of the principal difficulties is the pulsation produced by the conventional piston or plunger type pump. This requires the use of large gears with heavy bearings to avoid extremely rapid wear on the operating mechanism. Therefore, one of the principal objects of the present invention is to provide a device which delivers a smooth uninterrupted flow of high pressure fluid without pulsation.

Another object of the invention is to convert the hydraulic power from a non-pulsating or non-positive displacement pump to the movement of fluids or slurry laden fluids through the use of positive displacement pressure rams without the pulsation inherent in positive displacement pumps.

Another object of the invention is to provide a hydraulic power converter which is powered by a hydraulic fluid under constant pressure, and to convert this constant pressure against reciprocating heads between which a stationary dam is provided with valves to operate in such sequence as to use the full and uninterrupted intake hydraulic force without loss and directing its full force against the opposing heads even when the heads reverse directions of movement.

Another object of the present invention is to provide a converter for high pressure fluids having resiliently mounted piston heads and an expansible stem therebetween so that as the flow of pumping fluid is switched from one piston head to the other both of the heads move in opposite directions simultaneously during the moment of switchover or reverse movement, thereby providing a smooth non-pulsating flow of pumped fluid or slurry which passes through the converter.

Another object of the present invention is to provide a hydraulic power converter for using one fluid to transmit power to move another fluid in such a way that the two fluids are kept separate.

Another object is to provide a device for transmitting fluid power from a non-pulsating continuous delivery pump to actuate positive displacement rams, operating against a fluid that would damage a centrifugal rotary gear or other such pump.

Still another object of the present invention is to provide a device having relatively large slow moving piston heads operating through a central control portion or dam with the heads actuating spool valves therein to switch the flow of the hydraulic pressurized fluid therein and for opening and closing the inlet and exhaust valves within the pressurized cylinders, with a separate hydraulic pump using separate power to operate the control valves.

Still another object is to provide a device to use the output of a high speed hydraulic pump to reciprocate a large slow moving ram at a speed slow enough to move thick low viscous or slurry laden fluids, under high pressure without hydraulic hammer or pulsation.

Still another object is to provide a converter with rams having a divided piston with lubricant therein at an equal pressure with the pumped fluid and operating against hydraulic rings, and means to refill the lubricant supply.

Still another object is to provide a construction having a drainage means between the pumped fluid and the pumping fluid to prevent mixing of the two fluids.

Still another object is to provide a hydraulic power converter device powered by a pressure pump and adapted to convert the non-pulsating flow of fluid maintained in continuous circulation therein from the prime mover pump delivering a smooth uninterrupted non-pulsating fluid output.

Still a further object of the present invention is to provide a converter having a pair of opposed cylinders separated by a central control portion or dam and through which a double-headed piston reciprocates in a manner such that the output of said converter is continuous and uninterrupted by pulsation.

These and other objects and advantages will become apparent hereinafter.

The present hydraulic converter comprises a relatively large cylindrical chamber divided by a central control portion and housing a double-ended piston having the heads mounted for simultaneous movement in the same direction and for simultaneous movement in opposite directions to each other during the reversal of direction of their travel in the chamber. The present invention further comprises the structure and method hereinafter described and claimed.

In the accompanying drawings wherein like numerals refer to like parts wherever they occur:

FIG. 1 is a plan view of the present invention and shows the control system partly in schematic, FIG. 2 is an enlarged fragmentary sectional view taken along line 2—2 of FIG. 1, FIG. 3 is a fragmentary sectional view taken along line 3—3 of FIG. 4 showing the valve arrangement when the control spool valves are in an intermediate position, all of the exhaust valves are closed, and pumping fluid is flowing behind both pistons, FIG. 4 is a greatly enlarged sectional view taken along line 4—4 of FIG. 2, FIG. 5 is a fragmentary sectional view taken along line 5—5 of FIG. 3, FIG. 6 is an enlarged fragmentary sectional view of the central control portion showing the position of the parts when the main pistons are moving leftwardly immediately prior to switching of the control valve spools, FIG. 7 is a view similar to FIG. 6 but showing the position of the parts immediately after the spool valves have been shifted to their leftmost position and the piston heads are moving rightwardly, FIG. 8 is a sectional view partly broken taken along line 8—8 of FIG. 3, FIG. 9 is a schematic showing the relative position of the parts with the pumping piston moving leftwardly, FIG. 10 is a view similar to FIG. 9 at the time when the pumping fluid is switching and both of the pumping pistons are moving outwardly simultaneously, FIG. 11 is a view similar to FIGS. 9 and 10 but showing the relative position of the parts when the pumping piston is moving rightwardly.

Figure 6:
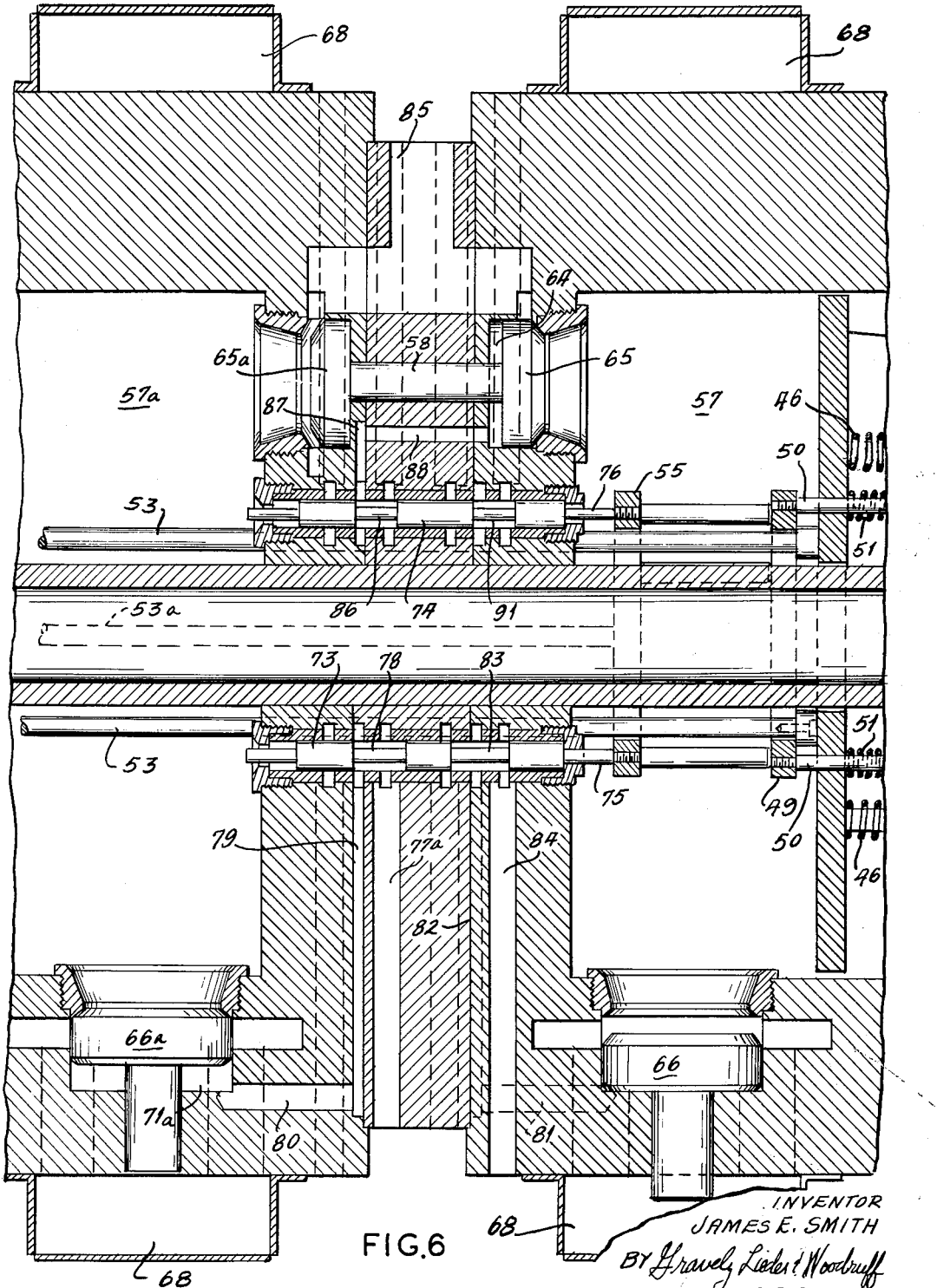

The present invention is embodied in a hydraulic power converter 10 comprising a pair of opposed longitudinally aligned cylinders 11 and 12 connected by a central control portion 13 with the heads 14 of a double-ended piston operating in the cylinders 11 and 12 and the stem 15 connecting the piston heads 14 being movable longitudinally through the central portion 13.

Attached to the piston heads 14 are pusher members 16 which also are movable through the cylinders 11 and 12 with the piston heads 14. The pusher members 16 have heads 17 which are resiliently mounted on the leading edges thereof and are movable with respect to the members 12. The pusher members 16 are the members which are in contact with the pumped fluid in the pumping chambers 18 which are end extensions of the cylinders 11 and 12. The pumped fluid enters the pumping chamber 18 through an internal seating inlet valve 19 which is biased toward a normally closed position by a spring 20 interposed between a retainer 21 on the end of the valve stem 22 in the intake line 22a, a plate 23 fixed to the cylinder 12 adjacent to the back side of the valve 19. The inlet valve 19 is opened on the intake or rightward (FIG. 2) stroke of the left piston 14a.

The pumped fluid is discharged from the pumping chamber 18 through an externally seated outlet valve 24 which is biased toward a normally closed position by a spring 25 positioned between the front face of the valve 24 and a retainer plate 26 on the downstream side of the valve 24 in the discharge line 27. The outlet valve 24 opens on the exhaust stroke (leftward in FIG. 2) of the left piston 14a.

The operation of corresponding valves 19 and 24 in the right cylinders 11 is the same, but occurs in opposed sequential relation to the action described in the left cylinder 12.

While the valves 19 and 24 are shown as spring loaded and operated by the suction and discharge of the pumped fluid, if the pumped fluid contained wood chips or other matter which might catch between the valves and the seats, the valves would be positively hydraulically operated.

Figure 14:
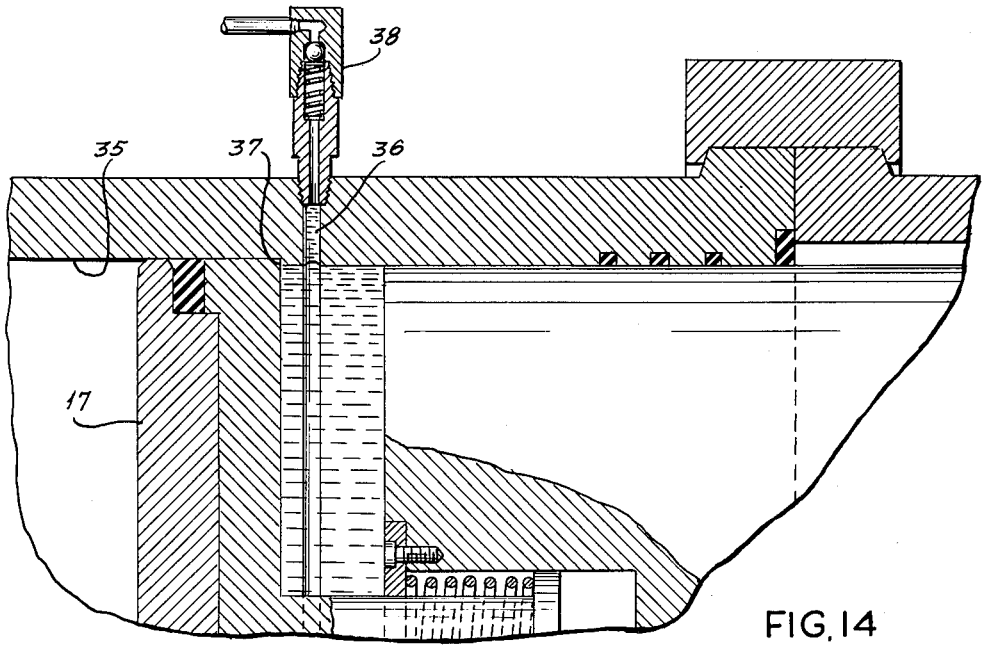
FIG. 14 is a greatly enlarged fragmentary sectional view of the oil seal arrangement for the working end of the pumping piston.
Figure 15:
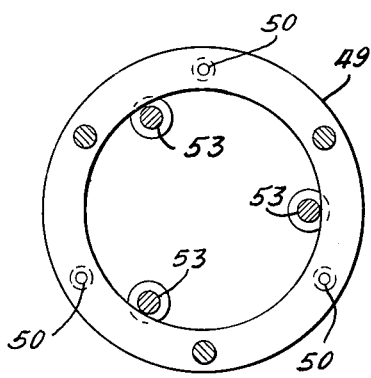
FIG. 15 is a sectional view taken along line 15—15 of FIG. 3.
Figure 16:
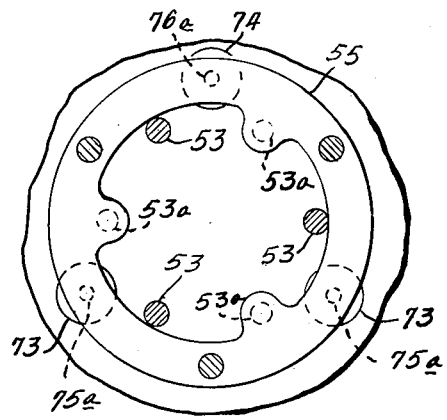
FIG. 16 is a sectional view taken along line 16—16 of FIG. 3.

The pusher member heads 17 include a seal member 28 positioned in an annular retaining groove 29 and a stem 30 positioned in a central pocket 31 in the leading end of the pusher member 16. A spring 32 is positioned between a retainer 33 on the end of the stem 30 and a retainer 34 closing the open end of the pocket 31. The back side of the head 17 and the front edge of the plunger member or ram 16 are spaced apart to provide an oil chamber therebetween. The ram 16 is spaced from the internal surface 35 of the cylinder to define an annular lubricating oil chamber in communication with the oil chamber at the end of the member 16. The lubricant is under slightly greater pressure than the pumped fluid because of the action of the spring 32, and allows the use of iron seal rings 35a. The lubricant also helps keep the pumped fluid from passing the seal 28, and is replenished through an oil supply port 36. Any leakage past the seal 28 is in the direction of the pumped fluid side of the head 17. An internal shoulder 37 in the cylinder 12 adjacent to and on the pumping chamber side of the port 36 engages the back side of the ram head 17 to stop the head 17 so that the chamber between the head 17 and the ram member 16 is of predetermined size at the end of the exhaust (leftward in FIG. 2) stroke of the piston 14a. FIG. 14 shows an enlarged view of this. This insures a constant volume of oil in the oil chamber which is replenished through the port 36 which is controlled by a check valve 38.

A drain 38a including an annular groove 38b is positioned between the ram member 16 and the piston head 14a to catch any foreign fluid which may possibly pass from either the pumped fluid or the pumping fluid before the same contaminates the other fluid.

The piston heads 14 and 14a are identical and head 14 shown in FIG. 3 will be described in detail. The head 14 is flexibly mounted on the stem 15 as is the mounting of the piston heads in my co-pending application Serial No. 175,767. In the present instance, the head 14 comprises a hollow intermediate member 40 and a closure member 41. The end member 39 is threaded to the end 42 of the internal member 43 and the outer member 44 which are relatively longitudinally slidable with respect to each other. The intermediate member 40 is connected to the end member 39 and to the pusher member 16 by fastening means 45. The closure member 41 is fastened to the open side of the hollow cup-shaped intermediate member 40 and is resiliently connected to the end of the outer stem member 44 through springs 46 and a mounting plate 47. This construction causes the stem members 43 and 44 to be movable with respect to each other so that the piston heads 14 and 14a can move in opposite directions simultaneously, which is necessary to achieve an uninterrupted flow of pumped fluid which is free of pulsations. The means by which this action is accomplished will be explained more fully hereinafter.

A seal 48 is retained between the peripheral edges of the end member 39 and the pusher member 16.

Connected to each of the piston heads 14 and 14a is a bracket 49 which is fastened by a pin 50 to the closure member 41. A spring 51 interposed between the internal surface of the member 41 and a retainer 52 on the pin 50 urges the bracket 49 into engagement with the members 41. Pull rods 53 are fastened to the right piston bracket 49 and carry a right piston spool actuator plate 54 on their opposite ends. Pull rods 53a are fastened on the left piston bracket and carry a left piston spool actuator plate 55 on their opposite ends. Spacers 56 separate the brackets 49 from the actuator plates 54 and 55. The rods 53 and 53a are spaced around the brackets 49 and pass freely through the central portion 13. The rods 53 and 53a also pass freely through the actuator 55 or 54 respectively which is not attached to that rod.

In operation, the left piston actuator plate 55 is controlled by the left piston 14a and moves therewith. Similarly, the right piston actuator plate 54 is controlled by the right piston 14 and moves therewith.

The right chamber 57 and the left chamber 57a defined respectively between the central portion 13 and the right piston 14, and between the central portion 13 and the left piston 14a contain the pumping fluid which controls movement of the pistons 14 and 14a.

The flow of pressurized fluid into the chambers 57 and 57a is controlled by four double-headed valves 58 which control the flow of pressurized fluid from a pump 59 through a conduit 60, an inlet port 61, and an inlet manifold 62, past the valve seats 63 and 63a. This is shown schematically in FIG. 1 and in detail in FIG. 3. The pump 59 may be any suitable pump which can deliver large quantities of pumped fluid under extremely high pressure. Preferably the pump 59 is a centrifugal pump which delivers a non-pulsating flow of pumped fluid uninterruptedly to the chambers 57 and 57a. The pump 72 which controls the position of the valves 58 is independent of the pumped fluid system so that the entire output from the pump 59 is used to move the piston heads 14 and 14a.

Movement of the valve 58 is controlled by applying pressure fluid to the chambers 64 and 64a behind the valve heads 65 and 65a as will be explained more fully hereinafter.

The pumping fluid is exhausted from the chambers 57 and 57a through exhaust valves 66 and 66a which control exhaust ports 67, exhaust manifolds 68 and exhaust conduits 69 to a storage receptacle 70. The exhaust valves 66 and 66a are maintained in closed condition by pressurized fluid in the chambers 71 and 71a behind the valves 66 as will be explained more fully hereinafter. Eight exhaust valves 66 are positioned around the periphery of the chamber 57 and valves 66a around the periphery of the chamber 57a to insure rapid exhausting of the pumping fluid.

The pressurized fluid which controls the operation of the valves 58, 66 and 66a is supplied to various passages in the central portion 13 from a pump 72 as indicated schematically by the arrows in FIG. 1.

Spool valves 73 control flow of the pressurized fluid to the exhaust valve control chambers 71 and 71a and a spool valve 74 controls flow of pressurized fluid to the inlet valve control chambers 64 and 64a.

The spool valves 73 have actuating extensions 75 and 75a on each end which are engaged by the left piston actuator 55 and the right piston actuator 54 respectively to move the valves 73 longitudinally through the central portion 13.

The spool valve 74 has actuating extensions 76 and 76a which also are engaged by the left piston actuator 55 and the right piston actuator 54 respectively to move the valve 74 longitudinally through the central portion 13.

Passages 77 and 77a in the central portion 13 are connected to the output side of the pump 72. When the spool valves 73 are in their rightward position (FIG. 6) and the piston heads 14 and 14a are moving leftward, the passage 77a is connected by reduced portion 78 on the spool valve 73 to passages 79 and 80 to the chambers 71a to close the exhaust valves 66a in the left chamber 14a. At the same time, the chambers 71 behind the right chamber exhaust valves 66 are connected to atmosphere or a fluid return tank by passages 81, 82 and reduced portions 83 of the spool valves 73 to an exhaust passage 84. This opens the valves 66 to allow the pumping fluid from the right chamber 14 to return to the tank 70.

When the spool valves 74 are in the rightward direction (FIG. 6), pressurized control fluid enters passageway 85 and communicates with the control chambers 64 behind the right chamber control valves 65 by reduced portion 86 in the spool valve 74, passage 87 and passage 88. This closes the valve 65 so that the pumping fluid in the chamber 14 is exhausted through the open valves 66.

The valve 65a is open to permit pumping fluid to flow into the left chamber 14a to move the piston heads 14 and 14a leftward.

When the spool valves 73 and 74 are shifted by the actuator 55 to their leftmost position (FIG. 7), the foregoing flows, etc., are reversed. With the spools 73 in their leftward position, pressurized fluid is communicated to the chambers 71 behind the right chamber exhaust valves 66 by passages 77, spool valve reduced portions 83, passages 82 and 81. The exhaust valves 66a are open to allow the pumping fluid in the left chamber to be exhausted. The chambers 71a are open to atmosphere or a return tank through passages 80 and 79, spool valve reduced portion 78 and exhaust passage 89.

When the spool 74 is in its leftward position, the valve 58 is shifted leftwardly to close the valves 65a and open the valve 65 thus allowing pumping fluid to enter the right chamber 57. The valve 58 is shifted leftwardly by pressurized fluid communicated from the passage 90, spool valve reduced portion 91, passages 92 and 93 to the chamber 64a behind the valve head 65a.

The foregoing describes the position of the various valves, etc., when the spool valves 73 and 74 are completely shifted. However, the essence of the present invention is found in the action of the valves, the fluid flows and the main piston heads during the shifting of the spool valves 73 and 74.

The fluid flow at this time is shown partially in FIG. 3 and diagrammatically in FIG. 10 where the spools 73 and 74 are in the process of being shifted from their leftmost position to their rightmost position. The spool valves 73 are so positioned that both the pressurized fluid passages 77 and 77a are connected to the chambers 71 and 71a to close all of the exhaust valves 66 and 66a. Therefore, the pumping fluid cannot escape from either chamber 57 or 57a. Furthermore, the spool valve 74 is partially shifted and moving from left to right and so positioned that the pressurized control fluid from the passage 90 (not shown in FIG. 3) is interrupted to the control chambers 64a, and is applied to the control chamber 64 from the passage 85, reduced portion 86, passages 87 and 88 so that pumping fluid from the manifold 62 enters both chambers 57 and 57a simultaneously to extend the telescoping stem members 43 and 44. This occurs only during the shift of the valve 58. This carries the actuator plate 54 to its rightmost position (FIG. 6) to cause the valve 58 to be shifted completely rightwardly to close the valves 64. The foregoing action is reversed when the spool valves 73 and 74 are moved from the rightward position of FIG. 6 to their leftmost position in FIG. 7 during the transition. The important aspect is that pumping fluid is supplied simultaneously to both pistons during the reversal of the head movement and that the piston heads actually move in opposite directions for a short distance at this time. The simultaneous outward movement of the flexible pumping piston heads allows the pumped fluid to be free of undesirable pulsations.

Figure 11:
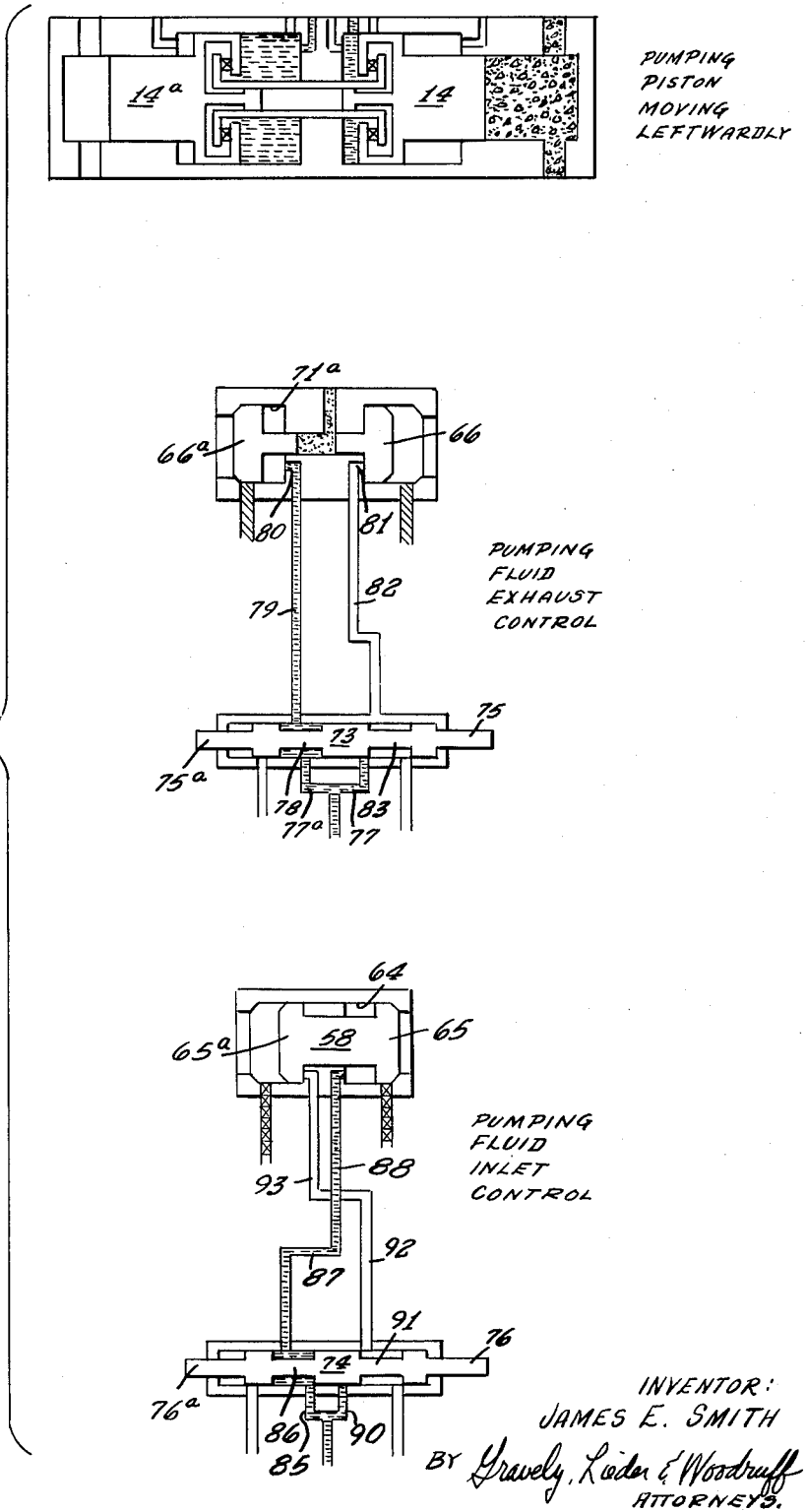

The various positions of the pistons, spool valves, inlet, and exhaust valves are schematically shown in FIGS. 9–11.

The springs 46 cause the extended shaft members 43 and 44 to return to their normal position.

Figure 12:
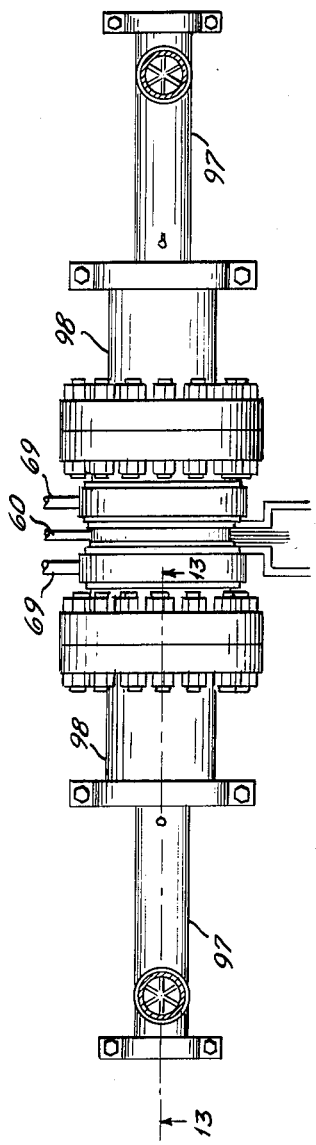
FIG. 12 is a plan view of a modification of the invention.
Figure 13:
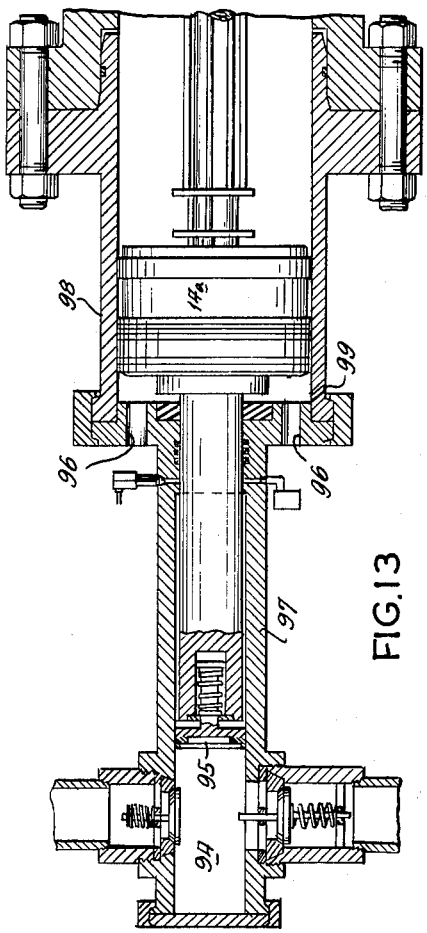
FIG. 13 is a sectional view taken along line 13—13 of FIG. 12.

FIGS. 12 and 13 show a modification of the present invention wherein the pressure of the pumped fluid in the pumped fluid chambers 94 is greatly increased due to the smaller diameter of the pumping piston 95 as compared to the main piston 14a. Vents 96 are positioned where the reduced cylinder portion 97 joins the enlarged cylinder portion 98 to allow air to escape and to prevent a vacuum being created on the stroke of the piston 14a. An oil escape passage 99 also is provided in the large cylinder 98 ahead of the travel of the piston 14a. In other respects, the construction and operation of the converter is identical to that hereinbefore described. This form of the invention is believed to have good applicability in high pressure drilling and the like where extremely high pressure fluid is needed. If the fluid has pulsations, it ruins rapidly the equipment with which it is used or pumped.

*Operation*

With the parts in the position shown in FIG. 6, that is, with the pistons 14 and 14a moving leftwardly so that the piston 14a is delivering pumped fluid through the discharge valve 24, the valve 58 is in its rightmost position and is held there by pressurized fluid from the passage 85 around the spool reduced portion 86 and the passages 87 and 88 to the control chamber 64 behind the valve head 65. Pumping fluid flows from the pump 59 through the conduit 60, the port 61, the manifold 62 past the valve 65a to the pumping chamber 57a. The spool valves 74 and 73 are in their rightmost position. The exhaust valves 66a are retained in their closed position by pressurized fluid delivered to the chamber 71a through passages 80, 79, spool valve reduced portion 78 and passage 77a.

At this point, the left piston actuator 55 carried by the rods 53a and connected to the left piston 14a engages the spool valve actuating portions 75 and 76 to move the spool valves 73 and 74 leftwardly. When the valves 73 and 74 are in an intermediate position (FIG. 3) all of the exhaust ports 66 and 66a are closed since pressurized fluid is delivered to the control chambers 71 and 71a. At this instant, the spool valve 73 is so positioned that pressurized fluid is delivered from the inlet passage 77 past the reduced portion 83 and through passages 82 and 81 to the control chamber 71. Also, pressurized fluid from the inlet passage 77a is delivered past the reduced portion 78 by passages 79 and 80 to the control chamber 71a. This positioning prevents escape of any pumping fluid from either of the chambers 57 or 57a.

Figure 7:
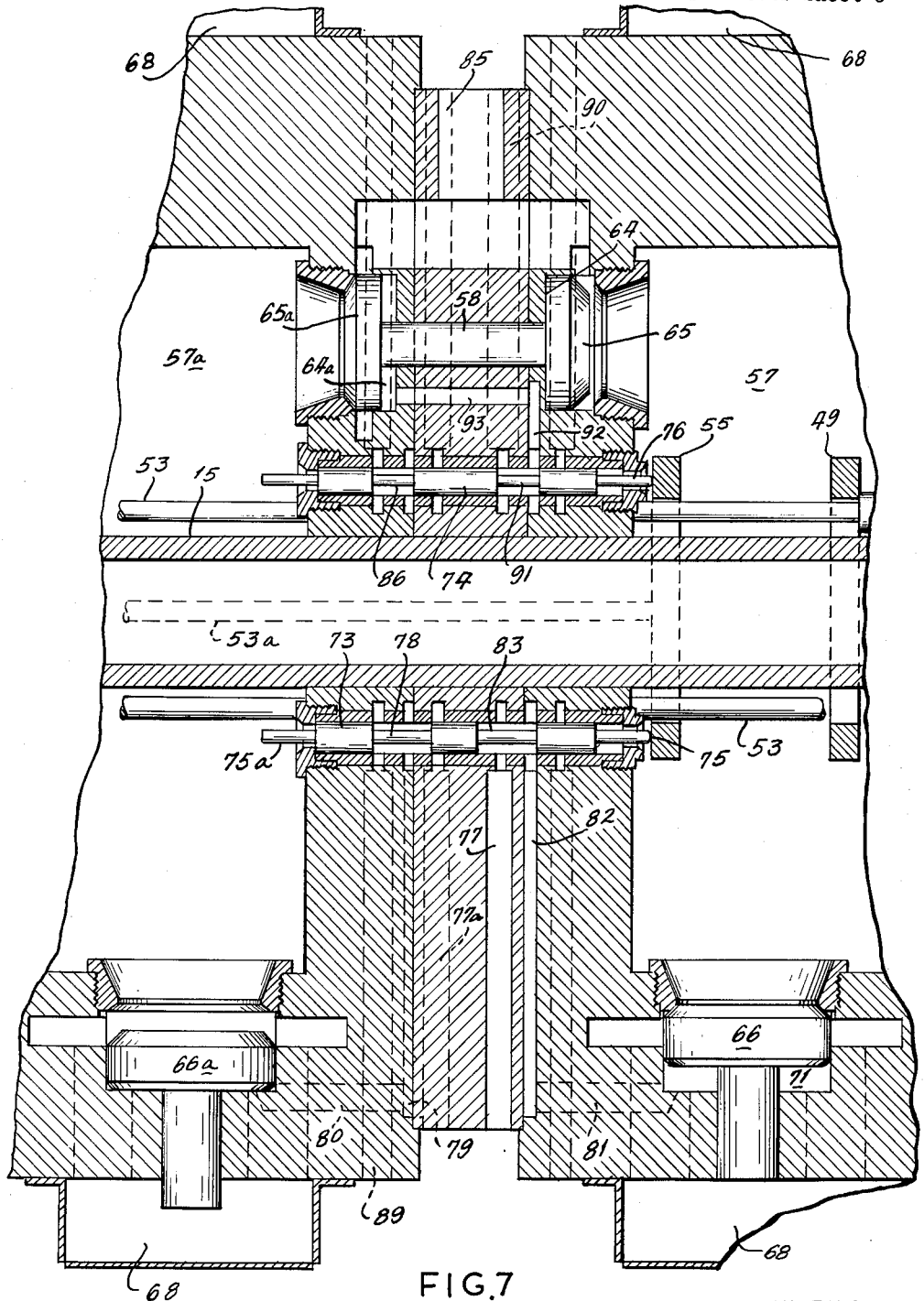
Figure 8:
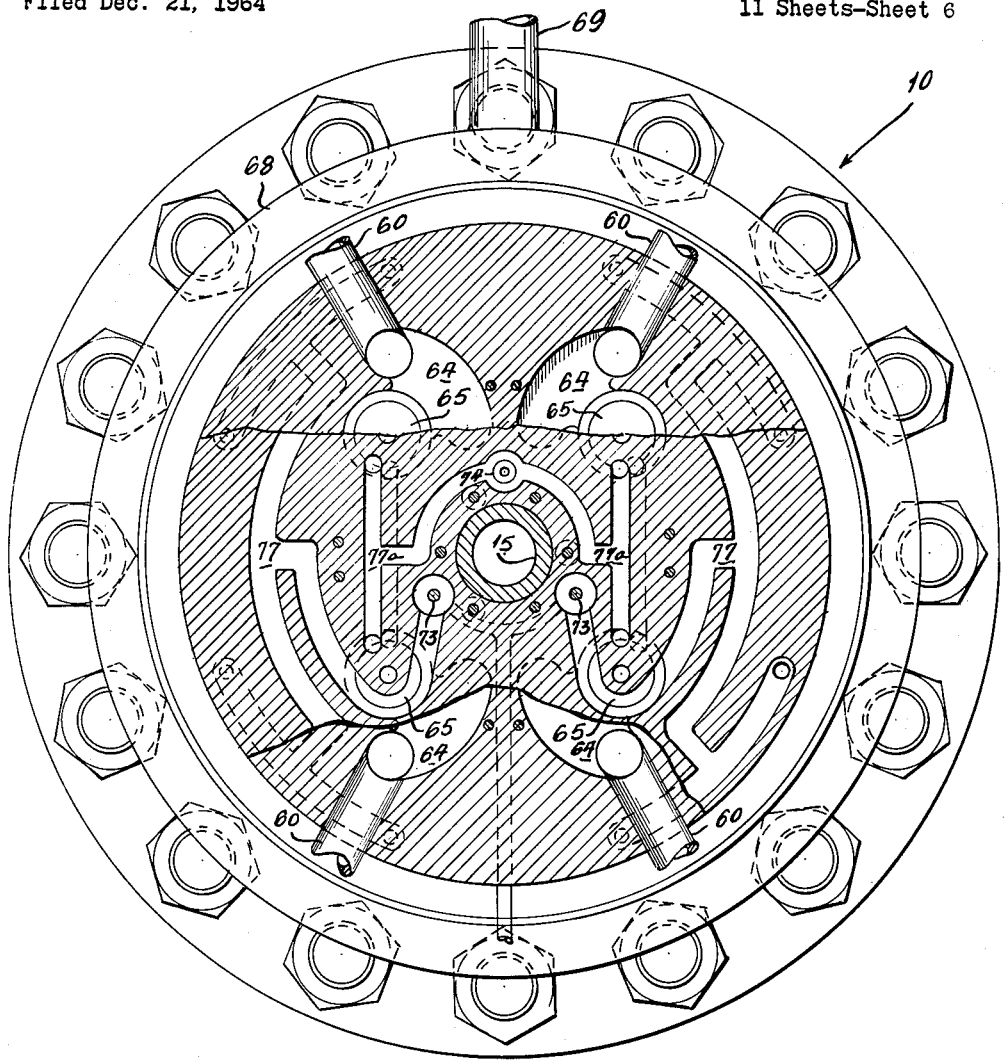

Simultaneously therewith, the spool valve 74 also has been moved to an intermediate position and so positioned that the inlet passage for pressurized fluid 85 is cut off by the portion of the spool valve 74 between the reduced portions 86 and 91. As the spool 74 is continued leftward, the inlet 90 is connected by reduced portion 91, and passages 92 and 93 to the chamber 64a to move the valve 58 leftward. This also gradually vents the chamber 64 by passages 88, 87, reduced portion 86 and exhaust passage 90a to permit flow of pumping fluid into the chambers 57 and 57a simultaneously during the period of shifting of the valve 58. Since this fluid cannot escape from either chamber 57 or 57a because the valves 66 and 66a are closed, both of the piston heads 14 and 14a move outwardly simultaneously. This provides a smooth transition and cushioning effect to initiate the rightward travel of the piston heads 14 and 14a. However, before the rightward travel of the left piston 14a can begin, the spool valves 73 and 74 must be moved to their leftmost position (FIG. 7). This is caused by the telescoping expansion of the center shaft parts 43 and 44. Since the control member 55 is connected to the left piston closure member 41, the continued leftward movement of the piston head 14a (including the member 41) causes the control valves 73 and 74 to be moved to their leftward position.

When the valve 73 is positioned in its leftward position, the control port 71a is connected to the atmosphere through the passages 80 and 79, the reduced portion 78 and the exhaust passage 89. This opens the exhaust valves 66a and allows the pumping fluid to be exhausted from the chamber 57a so that the piston heads 14 and 14a are free to move rightwardly simultaneously. At the same time, the pressurized fluid is maintained in the chamber 71 behind the right cylinder exhaust valve 66 through the inlet passage 77, the reduced portion 83 and the passages 82 and 81.

The spool valve 74 also is moved leftwardly so that the double-headed valve 58 moves to the leftward position closing the port 69a and permitting pumping fluid to flow freely to the right chamber 57. The valve 58 is maintained in its leftmost position by pressurized fluid from the passage 90 past the reduced portion 91 through passages 92 and 93 to the control chamber 64a.

The foregoing sequence is repeated as the piston moves back and forth through the chambers.

Another advantage of the converter is that the movement of the pumped fluid or slurry in passing through the chambers at their respective ends, tend, to actuate all of the valves therein at approximately the same instant, and, therefore, the driving rams are each traveling at approximately one-half of their normal speed of movement, which in turn will lessen the hydraulic hammer of the closing valves to approximately one-half the severity were it not for this slowdown of the respective rams during the moment of reversal. When operating the converter on pipelines, it is sometimes necessary to use a tandem arrangement to avoid a break in the suction or intake from the main pipeline.

This invention is intended to cover all changes and modifications of the examples of the invention herein chosen for purposes of the disclosure which do not constitute departures from the spirit and scope of the invention.

What I claim is:

1. A converter comprising a pair of longitudinally aligned cylinders separated by a central control portion, a double-ended main pumping piston slidably positioned in said cylinders, said piston including a main stem longitudinally movable through the central portion and heads positioned on the ends of said main stem, said main stem comprising telescoping relatively longitudinally movable members attached to the heads and movable with respect thereto, said heads being movable simultaneously in the same direction and at times in opposite directions, inlet and exhaust valves on the pumped fluid side of said piston heads for controlling flow of pumped fluid to and from said cylinders, and pumping fluid inlet and exhaust valves adjacent to the central control portion operable in response to movement of the piston heads.

2. The structure of claim 1 including separated ends on the pistons, lubricant retained in the space therebetween, and means to replenish the lubricant supply.

3. The structure of claim 1 including drain means in the cylinders and intermediate the ends of the piston to remove pumping fluid and pumped fluid which may pass the respective ends of the pistons before the passed fluids can contaminate the main body of other fluid.

4. The structure of claim 1 including reduced working ends on the pistons to increase the output pressure of the converter.

5. The converter of claim 1 including control means positioned in the central portion and actuated by the moving piston heads, said control means communicating and interrupting flow of pressurized fluid to control the movement of the pumping fluid intake and exhaust valves.

6. The structure of claim 5 including actuator pull rods for energizing the control means, said pull rods being connected to the piston heads and attached to an actuator in the opposite cylinder, said rods being slidable through the central portion.

7. A converter comprising a pair of longitudinally aligned cylinders separated by a central control portion, a double-ended main pumping piston slidably positioned in said cylinders, said piston including a main stem longitudinally movable through the central portion and heads positioned on the ends of said main stem, said heads being movable simultaneously in the same direction and at times in opposite directions, inlet and exhaust valves on the pumped fluid side of said piston heads for controlling flow of pumped fluid to and from said cylinders, and pumping fluid inlet and exhaust valves adjacent to the central control portion operable in response to movement of the piston heads, the main stem comprising telescoping members connected for movement with respect to the piston heads.

8. A system for delivering non-pulsating continuous positive discharge output comprising a high pressure pump having a discharge and inlet side, a hydraulic fluid converter defined in claim 1, conduit means connecting the discharge side of the pump to the pumping fluid intake valves, conduit means connecting the inlet side of the pump to the pumping fluid exhaust valves, and means for switching the flow of the pump output from one cylinder to another.

9. A system for delivering non-pulsating output comprising a pumping source of continuously pressurized fluid having output and intake sides, a hydraulic fluid converter defined in claim 1, conduit means connecting the discharge side of the pump to the pumping fluid intake valves, conduit means connecting the inlet side of the pumping fluid exhaust valves, a second independent pump delivering pressurized fluid to the central control portion, means to open and close the pumping fluid intake and exhaust valves in response to movement of the piston heads, and passage means communicating with the second pump with the control means and the valve means so that movement of the control means interrupts and establishes communication of pressurized control fluid to the intake and exhaust valves to alternately open and close the same.

10. A converter comprising a pair of longitudinally aligned cylinders separated by a central control portion, said central portion having a plurality of longitudinally movable spool valve means positioned therein and having portions extending into the cylinders, a double-ended main pumping piston slidably positioned in said cylinders, said piston including a main stem longitudinally movable through the central portion and heads positioned on the ends of said main stem, said main stem comprising telescoping relatively longitudinally movable members attached to the heads and movable with respect thereto, said heads being movable simultaneously in the same direction and at times in opposite directions, inlet and exhaust valves on the pumped fluid sides of said piston heads for controlling flow of pumped fluid to and from said cylinders, pumping fluid inlet valves in each side of the central control portion, communicating and interrupting flow of pressurized pumping fluid from a source thereof to the cylinders behind the piston heads, passage means in the central portion connected to a source of pressurized control fluid and communicating with said pumping fluid inlet valves and one of said spool valve means, longitudinal movement of said spool valve means switching the pressurized fluid to open and close the pumping fluid inlet valves to each cylinder, pumping fluid exhaust valves in the cylinders adjacent to the central portion, and passage means in the central portion connected to a source of pressurized control fluid and communicating with said pumping fluid exhaust valves and another of said spool valve means, longitudinal movement of said spool valve means switching the pressurized fluid to open and close the pumping fluid exhaust valves in each cylinder.

11. The converter of claim 10 wherein the moving piston heads carry actuator means which pass through the central portion to engage the portions of the spool valves which extend into the opposed cylinder to longitudinally move the said spool valves.

12. The converter of claim 11 wherein the main stem comprises telescoping members at each end, one of said telescoping members being fixedly mounted on the piston head and the other member being resiliently slidably connected to the piston head so that the piston heads are movable outwardly from the central portion simultaneously for a short distance.

13. The structure of claim 12 including separated ends on the pistons, lubricant being retained in the space therebetween, and means to replenish the lubricant supply.

14. A hydraulic power converter comprising a cylinder, a hydraulically impelled positive displacement ram reciprocal in said cylinder, means for self-lubricating said ram, pumped fluid intake and exhaust valve means for admitting and exchanging pumped fluid from the cylinder head of the ram, means for admitting and exhausting pumping fluid from the cylinder behind the ram, a resiliently mounted pumping extension on the leading end of the ram and spaced therefrom to provide a lubricant chamber, seal means around the periphery of the pumping extension, and means urging the pumping extension toward the ram to pressurize the lubricant trapped therebetween so that the lubricant is under greater pressure than the pumped fluid and any leakage past the seal means is toward the pumped fluid side of the ram extension.

References Cited by the Examiner
UNITED STATES PATENTS

| | | | |
|---|---|---|---|
| 580,049 | 4/1897 | Heim et al. | 103—204 X |
| 1,025,163 | 5/1912 | Schreidt | 103—51 |
| 1,483,143 | 2/1924 | Whitlock | 103—204 X |
| 1,774,967 | 9/1930 | Ellis | 103—204 X |
| 3,070,023 | 12/1962 | Glasgow | 103—51 |
| 3,135,210 | 6/1964 | English | 103—49 |

ROBERT M. WALKER, *Primary Examiner.*